（12） United States Patent
Higa (10) Patent No.: US 12,229,218 B2
(45) Date of Patent: Feb. 18, 2025

(54) LEARNING DEVICE, LEARNING METHOD, AND LEARNING PROGRAM (71) Applicant: NEC Corporation, Tokyo (JP)

(72) Inventor: Ryota Higa, Tokyo (JP)

(73) Assignee: NEC CORPORATION, Tokyo (JP)

(*) Notice: Subject to any disclaimer, the term of this patent is extended or adjusted under 35 U.S.C. 154(b) by 940 days.

(21) Appl. No.: 17/296,796

(22) PCT Filed: Dec. 7, 2018

(86) PCT No.: PCT/JP2018/045112
§ 371 (c)(1),
(2) Date: May 25, 2021

(87) PCT Pub. No.: WO2020/115903
PCT Pub. Date: Jun. 11, 2020

(65) Prior Publication Data
US 2022/0012540 A1 Jan. 13, 2022

(51) Int. Cl.
G06N 20/00 (2019.01)
G06F 17/11 (2006.01)
G06F 18/21 (2023.01)

(52) U.S. Cl.
CPC ............ *G06F 18/217* (2023.01); *G06F 17/11* (2013.01); *G06N 20/00* (2019.01)

(58) Field of Classification Search
None
See application file for complete search history.

(56) References Cited

U.S. PATENT DOCUMENTS

2017/0364831 A1 12/2017 Ghosh et al.

FOREIGN PATENT DOCUMENTS

CN 110402371 A * 11/2019 ........ B60W 30/0956
JP 2017091272 A 5/2017

OTHER PUBLICATIONS

International Search Report of PCT Application No. PCT/JP2018/045112 mailed Feb. 26, 2019.
English translation of Written opinion for PCT Application No. PCT/JP2018/045112 mailed Feb. 26, 2019.
Lipowski et al., "Statistical mechanics approach to a reinforcement learning model with memory", Physica A vol. 388, pp. 1849-1856, 2009.
Uchida et al., "Estimation of the change of agent's behavior strategy using state-action history", IEICE Technical Report, Mar. 6, 2017, vol. 116, No. 521, pp. 7-12, in particular, p. 8, ISSN 0913-5685.
Japanese Office Communication for JP Application No. 2020-558787 mailed on Jun. 21, 2022 with English Translation.

* cited by examiner

*Primary Examiner* — David R Vincent (57) ABSTRACT

The learning device 80 includes an input unit 81 and an imitation learning unit 82. The input unit 81 receives input of a type of a reward function. The imitation learning unit 82 learns a policy by imitation learning based on training data. The imitation learning unit 82 learns the reward function according to the type by the imitation learning, based on a form defined depending on the type.

11 Claims, 3 Drawing Sheets

LEARNING DEVICE, LEARNING METHOD, AND LEARNING PROGRAM

This application is a National Stage Entry of PCT/JP2018/045112 filed on Dec. 7, 2018, the contents of all of which are incorporated herein by reference, in their entirety.

TECHNICAL FIELD

The invention relates to a learning device, a learning method, and a learning program for learning a reward of an aspect that meets the requirement of an analyst.

BACKGROUND ART

In the field of AI (artificial intelligence), various algorithms have been proposed to perform machine learning. The data assimilation method is a method for reproducing phenomena using a simulator. For example, natural phenomena with high nonlinearity is reproduced by a numerical model. Other machine learning algorithms, such as deep learning, are also used for determining parameters of a large-scale simulator and extracting features.

In addition, reinforcement learning is known as a method for learning appropriate behavior according to the state of the environment for an agent that performs an action in an environment where the state can change. For example, non-patent document 1 describes a method to efficiently perform reinforcement learning by using domain knowledge of statistical mechanics.

CITATION LIST

Non-Patent Literature

Non-patent Literature 1: Adam Lipowski, et al., "Statistical mechanics approach to a reinforcement learning model with memory", Physica A vol. 388, pp. 1849-1856, 2009

SUMMARY OF INVENTION

Technical Problem

Most of the AI needs to define a clear goal and evaluation criteria before preparing the data. For example, in reinforcement learning, it is required to define a reward based on an action and a state, but the reward cannot be defined if the principle mechanism is not known. In other words, a general AI is not data-driven, but goal/evaluation method-driven.

Specifically, when determining the parameters of a large-scale simulator as described above, it is necessary to determine a goal. In feature extraction using deep learning, it is possible to determine which feature is effective, but certain evaluation criteria are also needed when learning the features themselves. The same is true for the method described in non-patent literature 1.

Even in the case where the principle mechanism of actions and states can be understood, when attempting to define the reward corresponding to the acquired data, the required type of reward may vary. For example, the definition of the reward is sometimes required so that an action mechanism of the agent can be understood, the definition of the reward is sometimes required so that accuracy is given the highest priority even if the specifications are complex.

Since a lot of data can be collected in recent years, it is preferable to be able to define a reward based on the acquired data, and furthermore, it is preferable to be able to generate a reward of an aspect that meets a requirement of an analyst.

Therefore, it is an object of the present invention to provide a learning device, a learning method, and a learning program that can learn a reward of an aspect that meets a requirement of an analyst.

Solution to Problem

A learning device according to the present invention includes an input unit which receives input of a type of a reward function; and an imitation learning unit which learns a policy by imitation learning based on training data, wherein the imitation learning unit learns the reward function according to the type by the imitation learning, based on a form defined depending on the type.

A learning method according to the present invention includes receiving input of a type of a reward function; learning a policy by imitation learning based on training data; and learning the reward function according to the type by the imitation learning, based on a form defined depending on the type.

A learning program according to the present invention causes a computer to execute an input process of receiving input of a type of a reward function; and an imitation learning process of learning a policy by imitation learning based on training data, wherein in the imitation learning process, the learning program causes the computer to learn the reward function according to the type by the imitation learning, based on a form defined depending on the type.

Advantageous Effects of Invention

According to this invention, a reward of an aspect that meets a requirement of an analyst can be learned.

DESCRIPTION OF EMBODIMENTS

Hereinafter, example embodiments of the present invention will be described with reference to the drawings.

Figure 1:
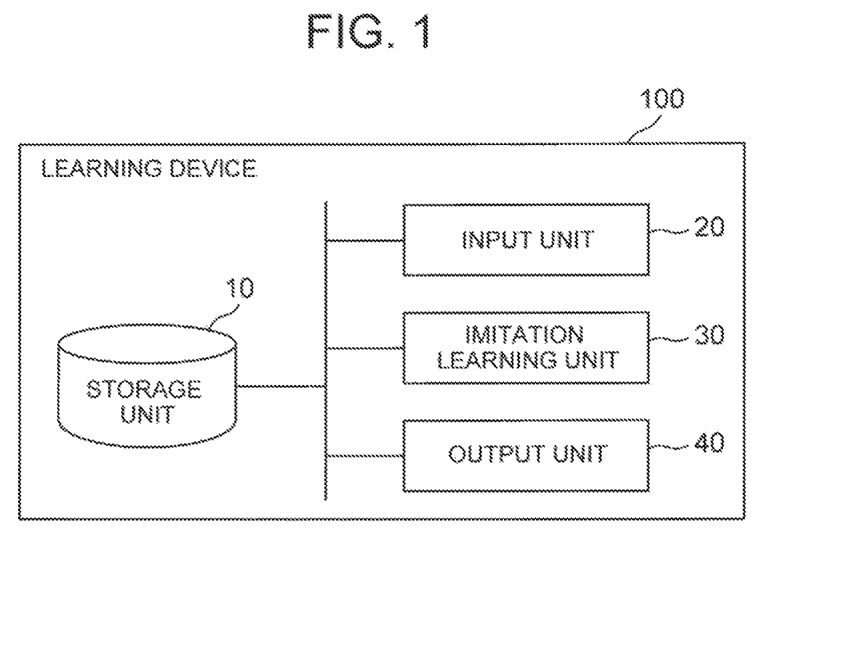
FIG. 1 It depicts a block diagram showing an example embodiment of a learning device according to the present invention.

FIG. 1 is a block diagram showing an example embodiment of the learning device 100 according to the present invention. The learning device 100 of this example embodiment is comprises a storage unit 10, an input unit 20, an imitation learning unit 30, and an output unit 40.

The storage unit 10 stores data (hereinafter referred to as "training data") that associates a state vector s=(s1, s2, . . . ) which represents the state of the target environment with an action "a" performed in the state represented by the state vector. Here, as assumed in general reinforcement learning, an environment (hereinafter, referred to as the target environment) with multiple possible states, and an object (hereinafter referred to as the agent) who can perform multiple actions in that environment. In the following explanation, the state vector s may be referred to simply as state s.

An example of the agent is an autonomous car, for example. In this case, the target environment is represented as a set of states of the autonomous car and its surroundings (for example, maps of the surroundings, positions and speeds of other vehicles, and road conditions).

The action to be taken by the agent depends on the state of the target environment. In the example of an autonomous car described above, if there is an obstacle in front of the car, the car needs to proceed to avoid the obstacle. In other cases, the speed of the car needs to be changed according to the condition of the road surface ahead and the distance between the car and another car in front.

The function that outputs an action to be taken by the agent according to the state of the target environment is called a policy. The imitation learning unit 30, described below, generates a policy through imitation learning. If the policy is learned to be perfect, the policy outputs the optimal action to be taken by the agent depending on the state of the target environment.

The input unit 20 inputs a type of a reward function to be generated by the imitation learning unit 30 described below. The type of the reward function is information specified in terms of what an analyst requires of the reward function, and specifically, the information is information that identifies the type of the reward function. The types of the reward function mainly include a type of the reward function of a manner used when speed is required for the optimization process (hereinafter, referred to as the speed requirement type), a type of the reward function of a manner used when accuracy is required (hereinafter, referred to as accuracy requirement type), a type of the reward function of a manner used when interpretability is required (hereinafter referred to as interpretability requirement type), etc.

The input unit 20 may receive only one type of the reward function, or may receive multiple types of the reward function. The input unit 20 may also receive an input of text expressing request of the analyst, and then determine the type of the reward function based on the content of the received text. In the following, the above three types (i.e., speed requirement type, accuracy requirement type, and interpretability requirement type) will be mainly described. However, the type of the reward function is not limited to the above three types. The viewpoint from which the reward function is defined limited to the above three types.

The imitation learning unit 30 performs imitation learning using the data associating the state vector s with the action a (i.e., the training data), and outputs a policy. The policy obtained by imitation learning imitates the given training data. Here, the policy, which is a rule for the agent to select an action, is denoted as $\pi$, and probability of selecting action a in state s under this policy it is denoted as $\pi(s, a)$. The method by which the imitation learning unit 30 performs imitation learning is arbitrary, and the imitation learning unit 30 can output a policy by performing imitation learning using a general method.

Furthermore, the imitation learning unit 30 performs imitation learning and outputs a reward function according to the received type. In other words, it can be said that the imitation learning unit 30 selectively designs a reward from among multiple types of the reward function assumed in advance. Specifically, the imitation learning unit 30 determines a policy that uses the reward r(s) obtained by inputting the state vector s into the reward function r as an input to the function. In other words, the action an obtained from the policy is defined by Equation 1 illustrated below.

$$a \sim \pi(a|r(s)) \quad \text{(Equation 1)}$$

Therefore, the imitation learning unit 30 may formulate the policy as a functional of the reward function. By performing imitation learning using the policy formulated in this way, the imitation learning unit 30 can also learn the reward function, while learning the policy.

The probability of selecting state s' from a certain state s and action a can be expressed as $\pi(a|s)$. When the policy is defined as shown in Equation 1 above, a relationship of Equation 2 illustrated below can be defined, using the reward function r(s, a). The reward function r(s, a) may also be expressed as $r_a(s)$.

$$\pi(a|s) := \pi(a|r(s,a)) \quad \text{(Equation 2)}$$

Since the probability of selecting a policy $\pi(a|s)$ is related to the reward obtained by action a in a certain state s, the policy can be defined in the form of Equation 3 illustrated below, using the reward function $r_a(s)$ described above. It should be noted that $Z_R$ is the partition function, and $Z_R = \Sigma_a \exp(r_a(s))$.

[Math. 1]

$$\pi(a \mid s) := \frac{\exp(r_a(s))}{Z_R} \quad \text{(Equation 3)}$$

In this example embodiment, the imitation learning unit 30 learns a reward function r(s, a) using a function defined depending on the type of the reward function. The following is a specific explanation for each type of the reward function.

The first type of the reward function is the speed requirement type. Recently, quantum annealing has been known as a method for solving a combinatorial optimization problem at high speed. As inputting of a device for performing quantum annealing (hereinafter, referred to as a quantum annealing machine), for example, an Ising model is used. The functional form of the Ising mode is represented by Equation 4 shown below. In Equation 4, (s, a), which represents the state, corresponds to $\sigma$ in the Ising model, and the parameters $\theta$ correspond to Jij and hi.

[Math. 2]

$$H(t) = A(t)H_X + B(t)H_P, t \in [0, t_f] \quad \text{(Equation 4)}$$
$$H_X = -\Sigma_i \sigma_i^x$$
$$H_P = \sum_i h_i \sigma_i^z + \sum_{i<j} J_{ij} \sigma_i^z \sigma_j^z$$

When the input unit 20 receives the speed requirement type as the type of the reward function, the imitation learning unit 30 learns the reward function (specifically, the parameter $\theta$) based on a model (for example, a function of the type that represents the Ising model shown in Equation 4 above) of the type (form) required in the device performing the optimization process. By learning the reward function using such a function of the type (form), the imitation learning unit 30 can generate a reward function of the type (form) required in the quantum annealing machine.

In the above description, it is assumed that a specialized machine for an Ising model is used for the optimization process, and an idea is illustrated that the imitation learning unit 30 learns the reward function by imitation learning, based on t the function of the type (form) that represents the Ising model. However, the input function form is not limited to the Ising model. For example, when a quantum annealing machine that uses the Hubbard model is used, the imitation learning unit 30 may learn the reward function by imitation learning based on a function of a type (form) that represents the Hubbard model.

The second type of the reward function is the accuracy requirement type. For example, a deep neural network (DNN) can be considered as a model that can obtain a highly accurate solution. The functional form of the neural network is shown in Equation 5 below, when the reward function is $r_\theta(s, a)$.

[Math. 3]

$$r_\theta(s,a) := f(s,a,\theta) = f_1(f_2(\ldots (f_n(s,a,\theta_n), \ldots), \theta_2), \theta_1) \quad \text{(Equation 5)}$$

When the input unit 20 receives the accuracy requirement type as the type of the reward function, the imitation learning unit 30 learns the reward function (specifically, the parameter $\theta$) based on a function of the type (form) shown in Equation 5 above (i.e., a function of the type showing the neural network). By learning the reward function using such a function of the type (form), the imitation learning unit 30 can output a reward function according to the type of the neural network. By performing parameter tuning on this reward function by, for example, an analyst, it is possible to obtain a more accurate solution.

The third type of the reward function is the interpretability requirement type. For example, a linear function ($r=\theta_1 s_1 + \theta_2 s_2 + \ldots$), a decision tree, and text representation can be considered as a model that can obtain a reward function with high interpretability. The functional form of a decision tree is expressed, for example, in Equation 6 illustrated below. In Equation 6, $\sigma$ is defined as a node or a class.

[Math 4]

$$r(s, a \mid \theta, \sigma) := \sum_i \theta_{i,\sigma} s_i + \sum_j \theta_{j,\sigma} a_j \quad \text{(Equation 6)}$$

When the input unit 20 receives the interpretability requirement type as the type of the reward function, the imitation learning unit 30 learns the reward function based on a function of the type (form) indicating a linear function, a decision tree, or text representation. The imitation learning unit 30 can output a reward function with high interpretability by learning the reward function using a function of such a type (form).

Figure 2:
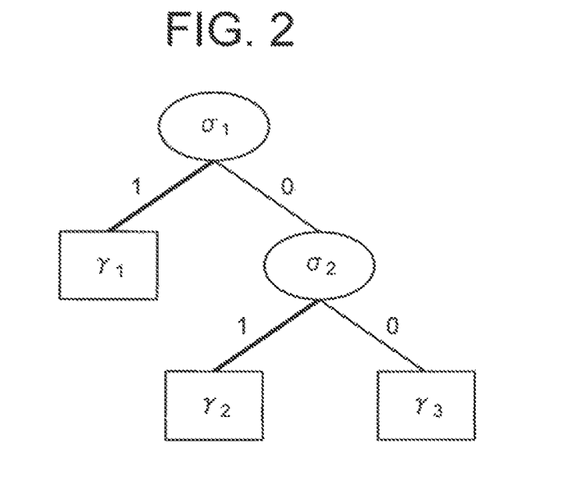
FIG. 2 It depicts an explanatory diagram showing an example of a learning result using a functional form of a decision tree.

FIG. 2 illustrates an explanatory diagram showing an example of a learning result using a functional form of a decision tree. In the example shown in FIG. 2, $\sigma$ is regarded as representation of a node and $r_i$ is regarded as representation of a linear regression. For example, by generating a result combining the decision tree and the linear regression can be generated, as illustrated in FIG. 2, as a result of learning the reward function based on Equation 6 above, the objective function depending on a condition can be presented in a manner that is easy for the analyst to understand. For example, when $\sigma$ indicates weather ($\sigma_1$=sunny, $\sigma_2$=rainy, etc.), it is possible to design a separate objective function for sunny weather and one for rainy weather.

In addition, the output of such highly interpretable reward function can be converted into information (for example, a text or numerical data) that can be explained to the user, and it can make it possible to handle human-in-the-loop and multimodal.

The output unit 40 outputs the reward function generated as a result of learning of the imitation learning unit 30. For example, if there are multiple input types of the reward function, the output unit 40 outputs respective generated reward functions.

The output unit 40 may also output an evaluation result for the generated reward function together. The method of evaluation for the reward function is arbitrary. For example, the output unit 40 may output closeness between expert data (training data) used for learning and a prediction result based on the learned reward function as an evaluation result for each reward function.

This evaluation result may be referred to by the analyst to select the type of the reward function that is considered appropriate in terms of "what you want to perform". In addition, the input unit 20 may further receive a type of the reward function selected by the analyst. It becomes possible to design a reward function that is in accordance with use by performing further learning based on the accepted reward function type by the imitation learning unit 30.

The input unit 20, the imitation learning unit 30, and the output unit 40 are realized by a processor of a computer (for example, CPU (Central Processing Unit), GPU (Graphics Processing Unit), FPGA (field programmable gate array)) that operates according to a program (learning program).

For example, the program may be stored in the storage unit 10, and the processor may read the program and operate as the input unit 20, the imitation learning unit 30, and the output unit 40 according to the program. In addition, the function of the learning device 100 may be provided in a SaaS (Software as a Service) manner.

The input part 20, the imitation learning part 30, and the output part 40 may be realized by dedicated hardware, respectively. In addition, some or all of each component of each device may be realized by a general-purpose or dedicated circuit (circuitry), a processor, etc. or a combination of these. They may be configured by a single chip or by multiple chips connected via a bus. Some or all of components of each device may be realized by a combination of the above-mentioned circuitry, etc. and a program.

In the case where some or all of the components of the learning device 100 are realized by a plurality of information processing devices, circuits, or the like, the plurality of information processing devices, circuits, or the like may be centrally located or distributed. For example, the information processing devices, circuits, etc. may be realized as a client-server system, a cloud computing system, etc., each of which is connected through a communication network.

The storage unit 10 is realized by a magnetic disk or the like, for example.

Figure 3:
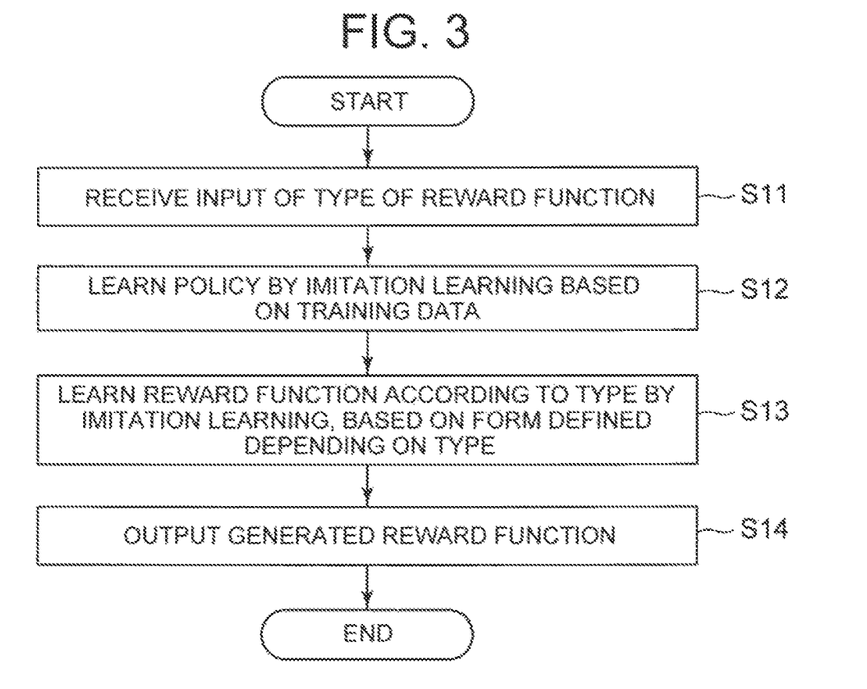
FIG. 3 It depicts a flowchart showing an example of an operation of a learning device.

Next, the operation of the learning device 100 of this example embodiment will be described. FIG. 3 is a flowchart showing an example of operation of the learning device 100 of this example embodiment. The input unit 20 receives an input of a type of the reward function (step S11). The imitation learning unit 30 learns a policy by imitation learning based on the training data (Step S12). Furthermore, the imitation learning unit 30 a reward function according to the type of the reward function by imitation learning, based on the type (form) defined depending on the inputted type of the reward function (Step S13). The output unit 40 outputs the reward function generated as a result of the learning (Step S14).

As described above, in this example embodiment, the input unit 20 receives an input of a type of the reward function, and the imitation learning unit 30 learns a policy by imitation learning based on training data. Furthermore, the imitation learning unit 30 learns a reward function according to a type of the reward function by imitation learning based on the type (form) defined depending on the type of the reward function. Thus, a reward of an aspect (type) that meets the requirement of the analyst can be learned.

For example, when reward designing based on expert data is attempted, the specification of the reward function to be obtained was not defined. On the other hand, in this example embodiment, the imitation learning unit 30 learns the reward function by imitation learning based on the type (form) defined depending on the type of the reward function. This makes it possible to design the reward function interactively with the analyst according to the way the reward function is used.

Specifically, for example, if the learned reward function is too simple, the required accuracy cannot be ensured. On the other hand, in this example embodiment, when the input unit 20 receives an input of the accuracy requirement type, the imitation learning unit 30 learns a reward function based on a DNN-type function. This enables the output unit 40 to output a DNN-type reward function. By performing parameter tuning on this reward function, it becomes possible to obtain a highly accurate solution.

In other cases, for example, when optimizing a learned reward function, the solution may not be obtained in a realistic time, depending on the manner of the reward function. One way to solve this problem is to use a quantum annealing machine, such as an Ising-specific machine, which can perform the optimization process at high speed.

However, designing a real-world problem as an Ising model that can be used in an Ising-specific machine is in itself very costly. On the other hand, in this example embodiment, when the input unit 20 receives an input of a speed requirement type, the imitation learning unit 30 learns a reward function based on a model of a type (form) required in the specialized machine.

In this way, the reward function of the Ising model can be obtained by setting and learning a type (form) of a reward function (for example, functional form of the Ising model) specific to quantum annealing. Therefore, since reconverting an objective function to the Ising model is no longer required, the overall cost of the work can be reduced.

Furthermore, for example, when trying to understand the mechanism of an action of an expert, it is desirable that the reward function be output in an understandable representation form. In this example embodiment, when the input unit 20 receives an input of an interpretability requirement type, the imitation learning unit 30 learns a reward function based on a function of a type (form) that a person can interpret. This enables the output unit 40 to output a reward function (objective function) of an explainable type (form). It becomes easier to understand the mechanism of the action of the expert by referring to this objective function.

Figure 4:
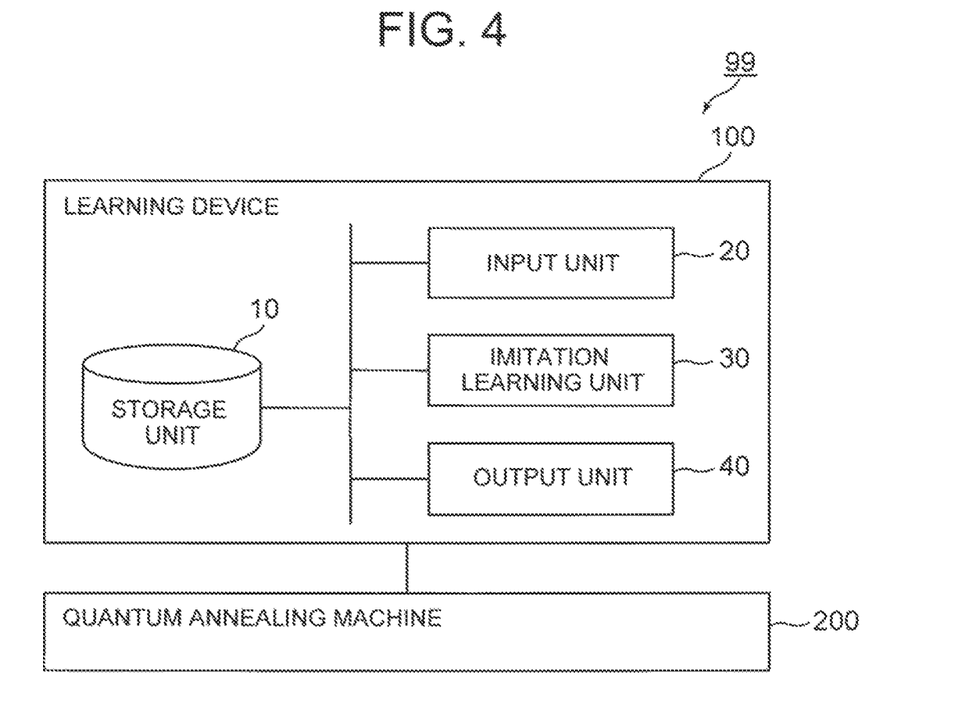
FIG. 4 It depicts a block diagram showing an example embodiment of an optimization system performing optimization by using a learning device.

Next, a specific example of a system using the learning device 100 of this example embodiment will be described. FIG. 4 is a block diagram showing an example embodiment of the optimization system 99 performing optimization by using the learning device 100 of this example embodiment. The optimization system 99 illustrated in FIG. 4 comprises a learning device 100 and a quantum annealing machine 200. The learning device 100 in this specific example is the same as the learning device 100 in the example embodiment described above.

In the learning device 100 of this specific example, the input unit 20 shall receive the first type of the reward function (i.e., the speed requirement type) as an input. It is also assumed that the quantum annealing machine 200 in this specific example is an Ising type-specific quantum annealing machine.

The imitation learning unit 30 learns a reward function by imitation learning based on the function indicating the type (form) of the Ising model illustrated in Equation 2 above. The output unit 40 outputs the reward function indicated by the Ising model as a result of the learning.

The quantum annealing machine 200 performs an optimization process using the reward function output by the output unit 40. Since the output reward function is presented in the Ising model, there is no need to reconvert it into an objective function. Therefore, an optimal solution at high speed can be obtained using the output reward function, while reducing the cost of the work.

Figure 5:
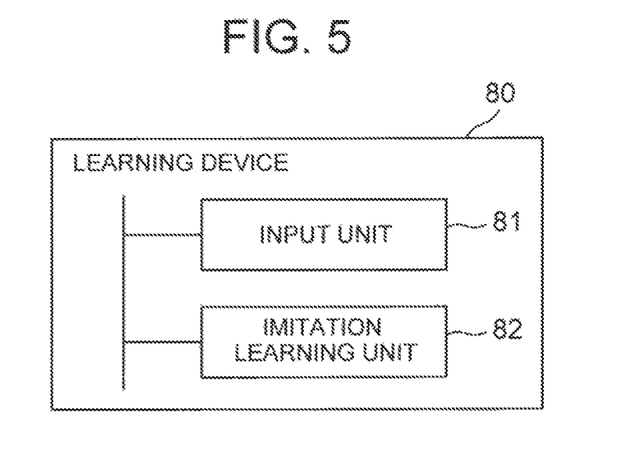
FIG. 5 It depicts a block diagram showing a summarized learning device according to the present invention.

Next, an overview of the present invention will be described. FIG. 5 shows a block diagram showing a summarized learning device according to the present invention. The learning device 80 (for example, learning device 100) according to the present invention comprises an input unit 81 (for example, input unit 20) which receives input of a type (for example, speed requirement type, accuracy requirement type, interpretability requirement type, etc.) of a reward function, and an imitation learning unit 82 (for example, imitation learning unit 30) which learns a policy by imitation learning based on training data (for example, expert data).

The imitation learning unit 82 learns the reward function according to the type by the imitation learning, based on a form defined depending on the type.

By such a configuration, the learning device can learn a reward of an aspect that meets a requirement of an analyst.

Specifically, the imitation learning unit 82 may formulate the policy as a functional of the reward function, and perform the imitation learning using the formulated policy to learn the reward function.

The input unit 81 may receive input of a type (for example, speed requirement type) that indicates the reward function of a manner used when speed is required for processing (optimization processing), as the type of the reward function. In this case, the imitation learning unit 82 may learn the reward function by the imitation learning, based on a model of the form required in a device (for example, a quantum annealing machine) that performs the processing (optimization processing).

Specifically, an Ising model-specific machine may be used for processing (optimization processing). In this case, the imitation learning unit 82 may learn the reward function by the imitation learning, based on a function of the form (for example, Equation 2 shown above) representing an Ising model.

The input unit 81 may receive input of a type (for example, accuracy requirement type) that indicates the reward function of a manner used when accuracy is required for processing, as the type of the reward function. In this case, the imitation learning unit 82 may learn the reward function by the imitation learning, based on a function of the form indicating a neural network.

The input unit 81 may receive input of a type (for example, interpretability required type) that indicates the reward function of a manner used when interpretability is required, as the type of the reward function. In this case, the imitation learning unit 82 may learn the reward function by the imitation learning, based on a function of the form indicating a linear model, a decision tree, or text representation.

The learning device 80 may comprise an output unit (for example, output unit 40) which outputs learned reward function. The output unit may output closeness between training data and a prediction result based on the learned reward function, as an evaluation result.

Figure 6:
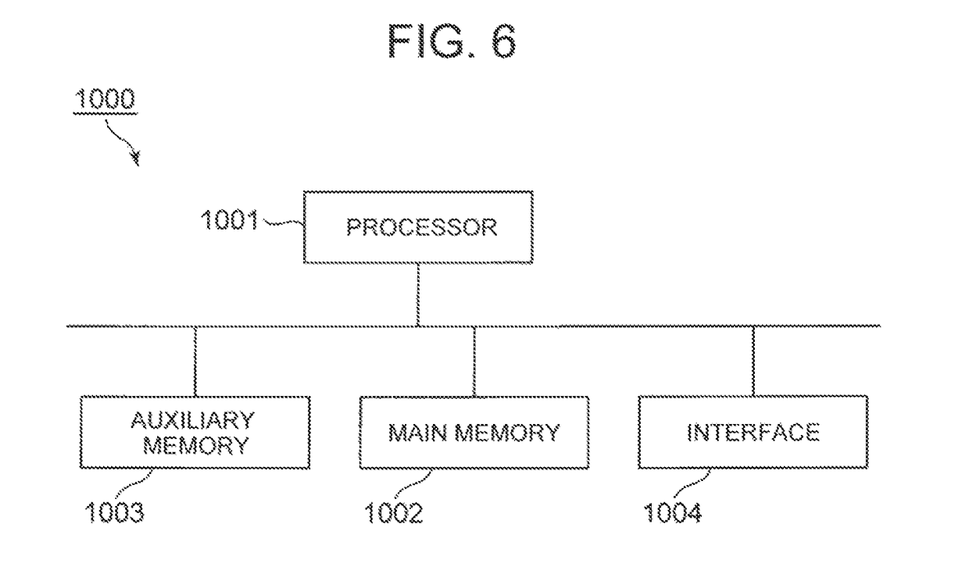
FIG. 6 It depicts a summarized block diagram showing a configuration of a computer for at least one example embodiment.

FIG. 6 is a summarized block diagram showing a configuration of a computer for at least one example embodiment. The computer 1000 comprises a processor 1001, a main memory 1002, an auxiliary memory 1003, and an interface 1004.

The learning device 80 described above is implemented in the computer 1000. The operation of each of the above-mentioned processing units is stored in the auxiliary memory 1003 in a form of a program (learning program). The processor 1001 reads the program from the auxiliary memory 1003, deploys the program to the main memory 1002, and implements the above-described processing in accordance with the program.

In at least one exemplary embodiment, the auxiliary memory 1003 is an example of a non-transitory tangible medium. Other examples of non-transitory tangible media include a magnetic disk, an optical magnetic disk, a CD-ROM (Compact Disc Read only memory), a DVD-ROM (Read-only memory), a semiconductor memory, and the like. When the program is transmitted to the computer 1000 through a communication line, the computer 1000 receiving the transmission may deploy the program to the main memory 1002 and perform the above process.

The program may also be one for realizing some of the aforementioned functions. Furthermore, said program may be a so-called differential file (differential program), which realizes the aforementioned functions in combination with other programs already stored in the auxiliary memory 1003.

The aforementioned example embodiment can be described as supplementary notes mentioned below, but are not limited to the following supplementary notes.

(Supplementary note 1) A learning device comprising:
an input unit which receives input of a type of a reward function; and
an imitation learning unit which learns a policy by imitation learning based on training data,
wherein the imitation learning unit learns the reward function according to the type by the imitation learning, based on a form defined depending on the type.

(Supplementary note 2) The learning device according to Supplementary note 1, wherein
the imitation learning unit formulates the policy as a functional of the reward function, and performs the imitation learning using the formulated policy to learn the reward function.

(Supplementary note 3) The learning device according to Supplementary note 1 or 2, wherein
the input unit receives input of a type that indicates the reward function of a manner used when speed is required for processing, as the type of the reward function, and
the imitation learning unit learns the reward function by the imitation learning, based on a model of the form required in a device that performs the processing.

(Supplementary note 4) The learning device according to Supplementary note 3, wherein an Ising model-specific machine is used for processing, and
the imitation learning unit learns the reward function by the imitation learning, based on a function of the form representing an Ising model.

(Supplementary note 5) The learning device according to Supplementary note 1 or 2, wherein
the input unit receives input of a type that indicates the reward function of a manner used when accuracy is required for processing, as the type of the reward function, and
the imitation learning unit learns the reward function by the imitation learning, based on a function of the form indicating a neural network.

(Supplementary note 6) The learning device according to Supplementary note 1 or 2, wherein
the input unit receives input of a type that indicates the reward function of a manner used when interpretability is required, as the type of the reward function, and
the imitation learning unit learns the reward function by the imitation learning, based on a function of the form indicating a linear model, a decision tree, or text representation.

(Supplementary note 7) The learning device according to any one of Supplementary notes 1 to 6, further comprising an output unit which outputs learned reward function,
wherein the output unit outputs closeness between training data and a prediction result based on the learned reward function, as an evaluation result.

(Supplementary note 8) A learning method, implemented by a computer, comprising:
receiving input of a type of a reward function;
learning a policy by imitation learning based on training data; and
learning the reward function according to the type by the imitation learning, based on a form defined depending on the type.

(Supplementary note 9) The learning method according to Supplementary note 8, implemented by the computer, further comprising
formulating the policy as a functional of the reward function, and performing the imitation learning using the formulated policy to learn the reward function.

(Supplementary note 10) A learning program causing a computer to execute:
an input process of receiving input of a type of a reward function; and
an imitation learning process of learning a policy by imitation learning based on training data,
wherein in the imitation learning process, the learning program causes the computer to learn the reward function according to the type by the imitation learning, based on a form defined depending on the type.

(Supplementary note 11) The learning program according to Supplementary note 10, wherein
in the imitation learning process, the learning program causes the computer to formulate the policy as a functional of the reward function, and perform the imitation learning using the formulated policy to learn the reward function.

REFERENCE SIGNS LIST 10 storage unit
20 input unit
30 imitation learning unit
40 output unit 99 optimization system
100 learning device
200 quantum annealing machine

What is claimed is:

1. A device comprising a hardware processor configured to execute software code to:
receive input of a type of a reward function, the reward function specifying a reward for performance of an action by an autonomous vehicle for a state of an environment of the autonomous vehicle, wherein
the state includes one or more of a map of and/or road conditions in surrounding of the autonomous vehicle, and positions and/or speeds of other vehicles in the surroundings, and
the action includes changing a path of the autonomous vehicle and a speed of the autonomous vehicle;
specify a model by which the reward function is to be learned, based on the type of the reward function, wherein the model is a deep neural network;
learn the reward function according to the specified model, thereby learning a policy for selecting the action to be performed by the autonomous vehicle based on the state of the environment of the autonomous vehicle;
receive a current state of the environment of the autonomous vehicle;
determine the action to be performed by the autonomous vehicle by applying the learned policy to the current state of the environment of the autonomous vehicle; and
control the autonomous vehicle to cause the autonomous vehicle to perform the determined action, wherein
when the current state indicates that there is an obstacle in front of the autonomous vehicle, the determined action is to change the path of the autonomous vehicle to avoid the obstacle, such that the learned policy provides a practical improvement in autonomous vehicle technology in that the learned policy provides for obstacle avoidance.

2. The device according to claim 1, wherein
the hardware processor is configured to execute the software code to formulate the policy as a function of the reward function, and perform imitation learning using the formulated policy to learn the reward function.

3. The device according to claim 1, wherein
the hardware processor is configured to execute the software code to:
receive, as the type of the reward function, input of a type that indicates the reward function as to a manner used when speed is required for processing; and
learn the reward function by imitation learning, based on a model of a form required in a device that performs the processing.

4. The device according to claim 3, wherein
an Ising model-specific machine is used for processing, and
the hardware processor is configured to execute the software code to learn the reward function by the imitation learning, based on a function of the form representing an Ising model.

5. The device according to claim 1, wherein
the hardware processor is configured to execute the software code to:
receive, as the type of the reward function, input of a type that indicates the reward function as to a manner used when accuracy is required for processing; and
learn the reward function by imitation learning, based on a function of the form indicating the deep neural network.

6. The device according to claim 1, wherein
the hardware processor is configured to execute the software code to:
receive, as the type of the reward function, input of a type that indicates the reward function as to a manner used when interpretability is required; and
learn the reward function by the imitation learning, based on a function of the form indicating a linear model, a decision tree, or text representation.

7. The device according to claim 1, wherein the hardware processor is configured to execute the software code to:
output the learned reward function; and
output closeness between training data and a prediction result based on the learned reward function, as an evaluation result.

8. A method performed by a computer and comprising:
receiving input of a type of a reward function, the reward function specifying a reward for performance of an action by an autonomous vehicle for a state of an environment of the autonomous vehicle, wherein
the state includes one or more of a map of and/or road conditions in surrounding of the autonomous vehicle, and positions and/or speeds of other vehicles in the surroundings, and
the action includes changing a path of the autonomous vehicle and a speed of the autonomous vehicle;
specifying a model by which the reward function is to be learned, based on the type of the reward function, wherein the model is a deep neural network;
learning the reward function according to the specified model, thereby learning a policy for selecting the action to be performed by the autonomous vehicle based on the state of the environment of the autonomous vehicle;
receiving a current state of the environment of the autonomous vehicle;
determining the action to be performed by the autonomous vehicle by applying the learned policy to the current state of the environment of the autonomous vehicle; and
controlling the autonomous vehicle to cause the autonomous vehicle to perform the determined action, wherein
when the current state indicates that there is an obstacle in front of the autonomous vehicle, the determined action is to change the path of the autonomous vehicle to avoid the obstacle, such that the learned policy provides a practical improvement in autonomous vehicle technology in that the learned policy provides for obstacle avoidance.

9. The method according to claim 8, further comprising formulating the policy as a function of the reward function, and performing imitation learning using the formulated policy to learn the reward function.

10. A non-transitory computer readable information recording medium storing a program executable by a processor to perform processing comprising:
receiving input of a type of a reward function, the reward function specifying a reward for performance of an action by an autonomous vehicle for a state of an environment of the autonomous vehicle, wherein
the state includes one or more of a map of and/or road conditions in surrounding of the autonomous vehicle, and positions and/or speeds of other vehicles in the surroundings, and the action includes changing a path of the autonomous vehicle and a speed of the autonomous vehicle;

specifying a model by which the reward function is to be learned, based on the type of the reward function, wherein the model is a deep neural network;

learning the reward function according to the specified model, thereby learning a policy for selecting the action to be performed by the autonomous vehicle based on the state of the environment of the autonomous vehicle;

receiving a current state of the environment of the autonomous vehicle;

determining the action to be performed by the autonomous vehicle by applying the learned policy to the current state of the environment of the autonomous vehicle; and controlling the autonomous vehicle to cause the autonomous vehicle to perform the determined action, wherein when the current state indicates that there is an obstacle in front of the autonomous vehicle, the determined action is to change the path of the autonomous vehicle to avoid the obstacle, such that the learned policy provides a practical improvement in autonomous vehicle technology in that the learned policy provides for obstacle avoidance.

11. The non-transitory computer readable information recording medium according to claim 10, wherein the processing further comprises formulating the policy as a function of the reward function, and performing imitation learning using the formulated policy to learn the reward function.

\* \* \* \* \*